Sept. 18, 1945.    A. C. SCHULZE    2,385,164
AUTO DIRECTOR
Filed March 27, 1944

INVENTOR.
A.C.Schulze
BY
ATTORNEYS.

Patented Sept. 18, 1945

2,385,164

UNITED STATES PATENT OFFICE 2,385,164

AUTO DIRECTOR

Albert C. Schulze, Riverside, Iowa

Application March 27, 1944, Serial No. 528,296

1 Claim. (Cl. 116—52)

This invention aims to provide a simple means whereby the driver of a motor car may signify his intentions as to turning laterally, altering speed and the like. The invention aims to provide a device of the class described in which by the oscillation of a handle in a vertical plane disposed longitudinally of the vehicle, swinging movement may be imparted to a signal, transversely of the vehicle.

Another object of the invention is so to arrange and proportion the handle which constitutes an operating mechanism for the device, that it will be convenient to a person handling a steering wheel, there being no interference, however, either with the operation of the handle or with the rotation of the steering wheel.

A further object of the invention is to supply novel means for supporting the main shaft by which motion is imparted from a handle to a transversely swinging signal.

A further object of the invention is to supply a secure support for working parts, portions of the support having a double function.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
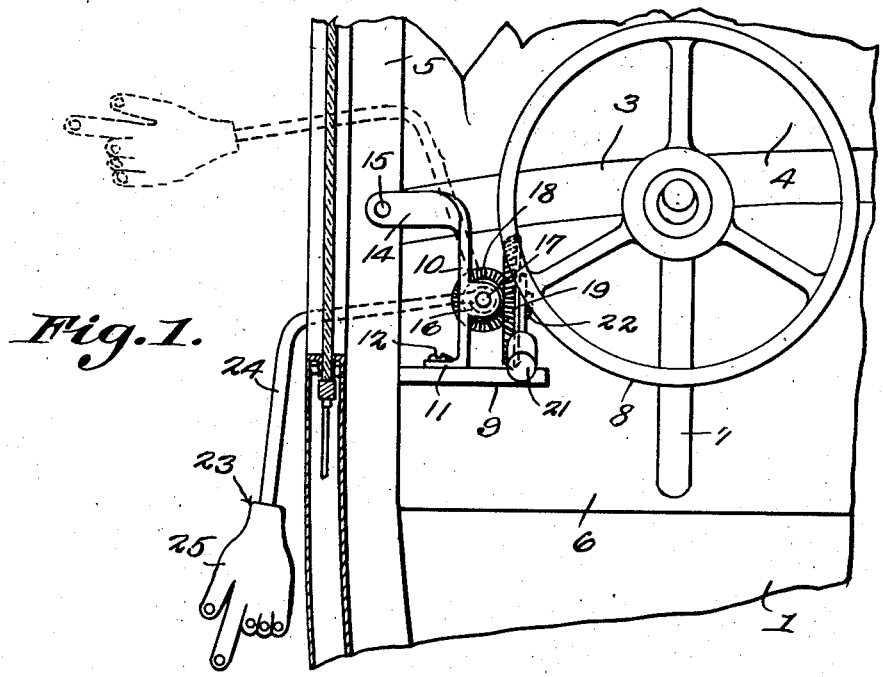
Fig. 1 is a cross section showing a portion of an automobile in which the device forming the subject matter of this application has been incorporated, most parts of the device per se appearing in rear elevation.

In the drawing there is shown a dashboard 1 of an automobile, the hood appearing at 2 and the windshield frame being shown at 3, the dashboard 1 extending upwardly to the windshield frame, the windshield frame carrying the usual transparent plate 4.

A corner post is shown at 5. An instrument panel 6 slants downwardly and rearwardly from the frame 3. The usual steering wheel column is marked by the numeral 7, the column carrying a steering wheel 8.

It is with such a structure, or with a similar one, that the device forming the subject matter of this application is adapted to be used.

The numeral 9 designates a substantially horizontal shelf which extends rearwardly from the dashboard 1, the shelf being engaged under the lower edge of the windshield frame 3. The shelf 9 is secured to the post 5, to the lower edge of the windshield frame 3 and to the dashboard 1. The shelf 9 extends inwardly toward the longitudinal, median vertical plane of the automobile.

At 10 there appears a substantially vertical standard, provided at its lower end with a laterally projecting foot 11, which is attached by a securing element 12 to the shelf 9. At its upper end, the standard 10 is supplied with an outwardly extended, substantially horizontal arm 14, which overlaps the rear surface of the post 5, the arm being fastened to the post by a securing element 15. Intermediate its ends, the standard 10 is provided with an inwardly projecting bearing bracket 16.

A substantial horizontal shaft 17 is journaled in the bearing bracket 16 and in the lower part of the windshield frame 3 and extends lengthwise of the vehicle. A beveled pinion 18 is secured to the shaft 17 and rotates within the bracket 16, the shaft 17 thus being held against longitudinal movement.

The beveled pinion 18 meshes with a beveled gear 19, held for rotation on a stub shaft 20, disposed at right angles to the shaft 17 and is secured to the standard 10. The forward end of a rearwardly projecting handle 21 is mounted to swing on the stub shaft 20, the handle being secured to the beveled gear 19 by an attaching element 22.

A signal 23 is provided and is located forwardly of the windshield frame 3. The signal 23 comprises an angular arm 24 having, at its outer end, a conventionalized human hand 25 or other device calculated to attract attention. At its inner end, the arm 24 carries a hub 26, which is attached to the forwardly extended part of the shaft 17 by a set screw 27 or equivalent device.

Grossly considered, the operation of the device is as follows:

Assuming that the hand 25 is in the depending, inoperative position of Fig. 1, the handle 21 rests on the shelf 9, the shelf thus serving as a stop for the handle, the standard 10 and its arm 14 constituting an overhead brace or hanger, which aids in supporting the shelf 9, to the rear of the post 5.

Figure 2:
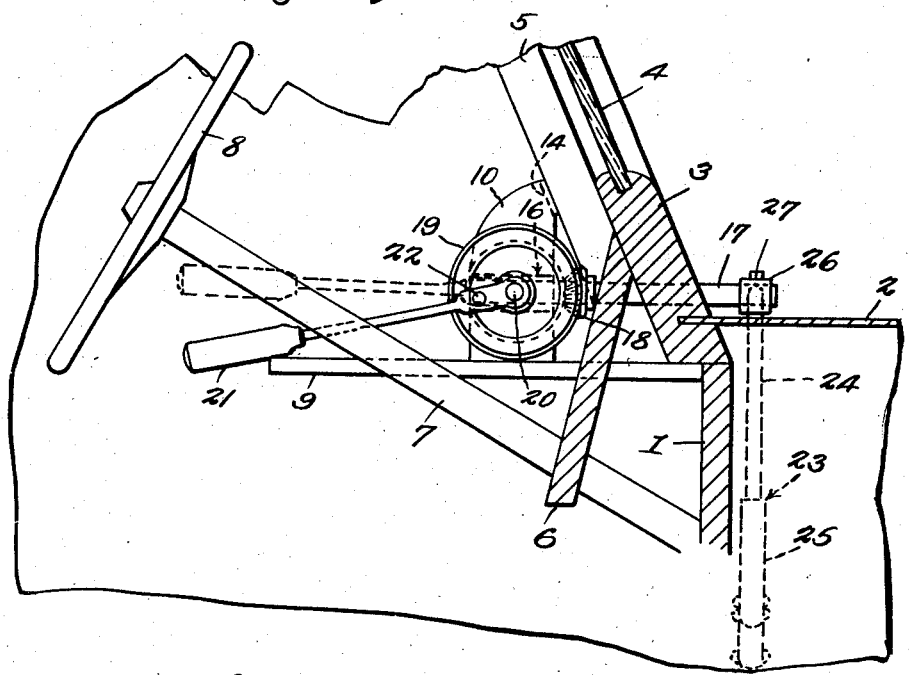
Fig. 2 is a vertical longitudinal section taken through a portion of an automobile equipped with the device forming the subject matter of this application, the device being shown in side elevation.

When the handle 21 is raised by an operator from the solid line position of Fig. 2 to the dotted line position of that figure, the beveled gear 19 is rotated, rotation being imparted to the beveled pinion 18 and to the shaft 17, an elevation of the hand 25 from the solid line position of Fig. 1 to the dotted line position of that figure, the driver of a car overhauling or approaching the one shown in the drawing being given monition that the car carrying the signal is about to make a turn. By swinging the handle 21 upwardly and downwardly, a vertical oscillatory movement is imparted to the hand 25 and this may be taken as an indication that the vehicle carrying the signal is about to stop. The information conveyed by the movement of the hand 25 may be fixed by regulation, custom or general accent.

It is to be noted that the rear end of the handle 21 moves in a limited arc, vertically, in close relation to the left hand side of the steering wheel 8, looking toward the front. The grip portion of the handle 21 always is readily accessible to the left hand of a person at the steering wheel 8.

The length of the handle 21, measured from the axis of the stub shaft 20 is such that the rear end of the handle is spaced forwardly from the steering wheel 8, and the rear end of the handle at no time projects rearwardly with respect to the steering wheel, a condition which would interfere first with the rotation of the steering wheel and with the vertical movement of the handle.

The device forming the subject matter of this application is simple in construction, but it will be found thoroughly advantageous for the ends in view and hereinbefore pointed out.

The handle 21 has a vertical swinging movement, which is convenient and desirable, and at the same time it is possible to impart rotation to the shaft 17 by the simple, inexpensive and substantial mechanism represented by the gear wheel 19 and the pinion 18.

The automobile body may be said to include the post 5 and adjacent parts. The shaft 9 is useful in supporting small articles. The handle 21 has its rear end disposed in front of the steering wheel 8, in approximate horizontal alinement with the lowermost portion of the wheel and in approximate vertical alinement with one outermost side portion of the wheel.

Having thus described the invention, what is claimed is:

A vehicle comprising a body and a windshield, a shelf having its forward end secured to the body in close relation to the windshield, the rear end of the shelf being free, a standard having its lower end secured to a portion of the shelf intermediate its ends and provided at its upper end with an outwardly extending arm secured to the body, the standard and the arm constituting a hanger for the shelf, a longitudinal shaft supported for rotation on the standard and extended forwardly with respect to the windshield, a handle extended rearwardly and longitudinally of the vehicle and mounted for vertical swinging movement on the standard, means for imparting rotation to the shaft from the handle, and a signal secured to the forwardly extended portion of the shaft and operating transversely of the vehicle, the rear portion of the shelf forming a stop which the handle engages when the signal is in inoperative position.

ALBERT C. SCHULZE.